Figure 4:
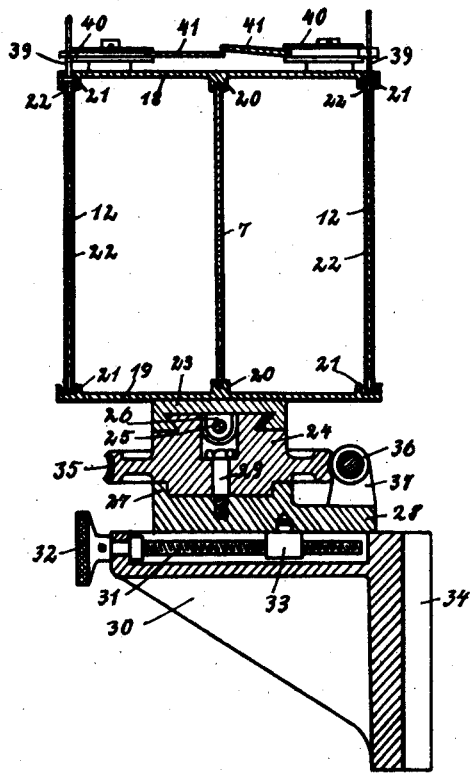

Jan. 4, 1927.
E. SCHÜFFTAN
APPARATUS FOR COMPOSITE CINEMATOGRAPHY
Filed July 6, 1925   3 Sheets-Sheet 1
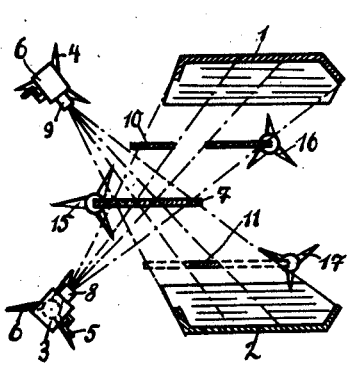
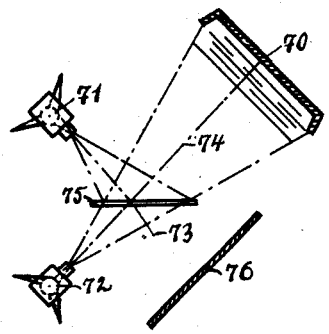
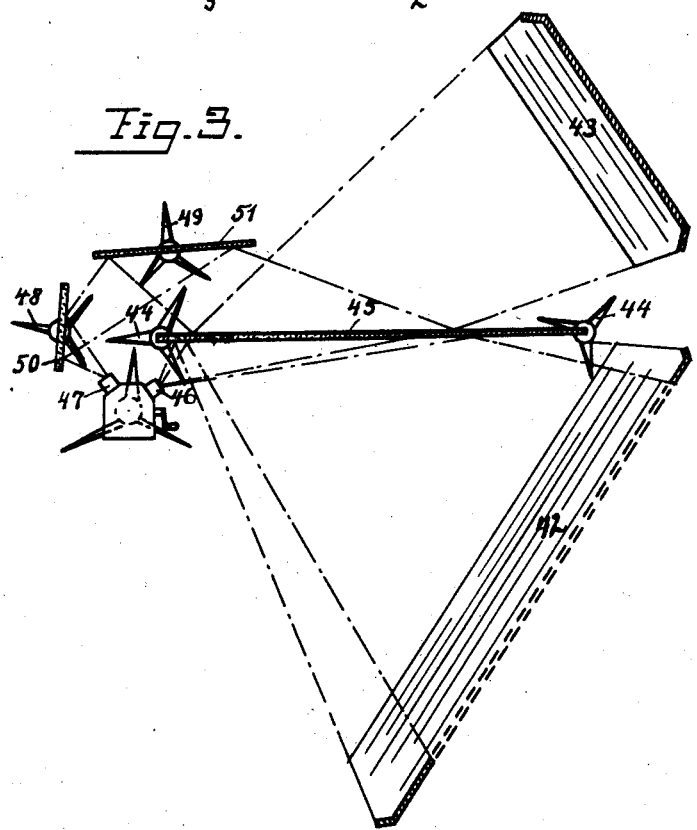
Witnesses
Inventor
EUGEN SCHÜFFTAN
BY
ATTORNEYS Jan. 4, 1927.

E. SCHÜFFTAN 1,613,201

APPARATUS FOR COMPOSITE CINEMATOGRAPHY

Filed July 6, 1925      3 Sheets-Sheet 2

Witnesses

Inventor
EUGEN SCHÜFFTAN
BY
ATTORNEYS

Jan. 4, 1927. 1,613,201
E. SCHÜFFTAN
APPARATUS FOR COMPOSITE CINEMATOGRAPHY
Filed July 6 1925  3 Sheets-Sheet 3

Witnesses
D. Mank

Inventor
EUGEN SCHÜFFTAN
BY
ATTORNEYS

Patented Jan. 4, 1927.

1,613,201

UNITED STATES PATENT OFFICE.

EUGEN SCHÜFFTAN, OF BERLIN-WILMERSDORF, GERMANY.

APPARATUS FOR COMPOSITE CINEMATOGRAPHY.

Application filed July 6, 1925, Serial No. 41,862, and in Germany May 9, 1923.

At cinematographic takings at which separately positioned scenery parts or a plurality of sceneries are to be united to one scenery or total picture it has hitherto only been possible to effect the taking with one apparatus on a film tape. It is frequently however required to make from a total scenery at least two completely identical takings and that simultaneously. To this end two apparatuses were positioned side by side which resulted however in different pictures on account of the parallax of both apparatuses. This disadvantage becomes disagreeably apparent particularly if the two pictures are subsequently to be united, and if it is necessary to produce silhouettes, full tone lights as well as half tone lights as photographs of actors and when such photographs must be exactly interfitted into each other. In order to overcome these disadvantages this present invention provides that the two apparatuses are set at an angle and a semi-permeable mirror is arranged at the section of the center lines of the two apparatuses so that the one apparatus takes the mirage, the other apparatus the throughsight through the mirror.

It is further necessary for the takings of different objects to separately take the object parts with two apparatuses or objectives which must result in the production of picturally interfitting takings. At combined takings it is further frequently necessary to use for each scene an objective of special focus and that particularly if the individual scenes must be positioned at different distances from the apparatuses, so for example if men of normal size are to act in unison as giants and dwarfs, whereas the background must have the same scale throughout.

By my present invention the possibility is provided to make cinematographic takings of two scenes of the same or of different size with the use of two taking apparatuses or objectives of the same or different focus. In the drawing in which I have more or less diagrammatically illustrated different embodiments of the invention—

Figure 5:
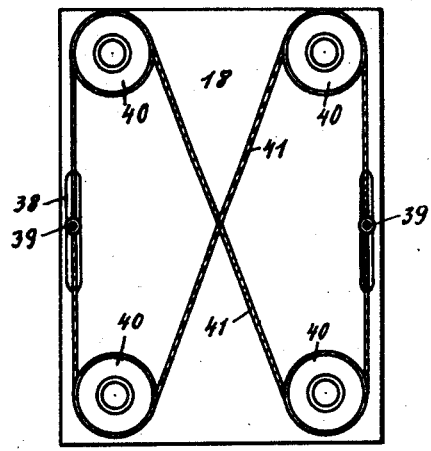
Figure 6:
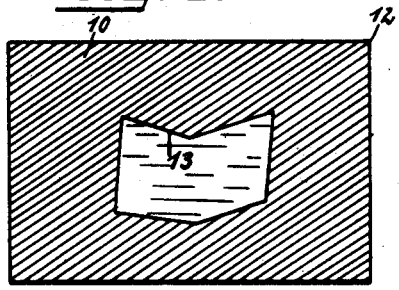
Figure 7:
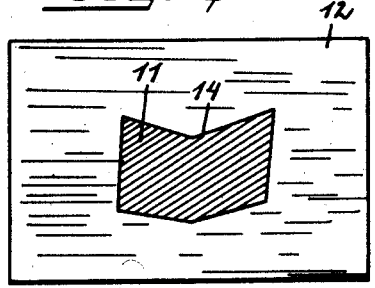
Figure 9:
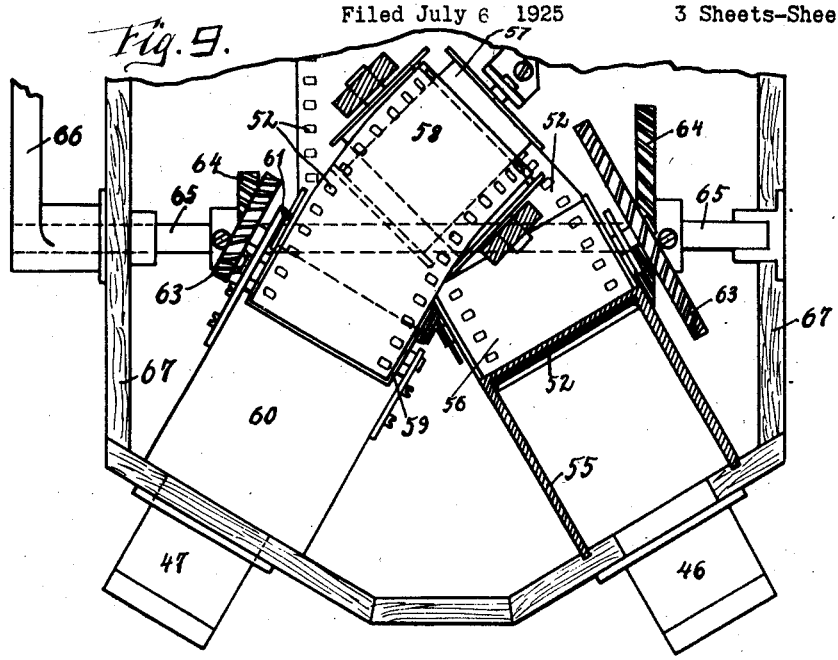
Figure 8:
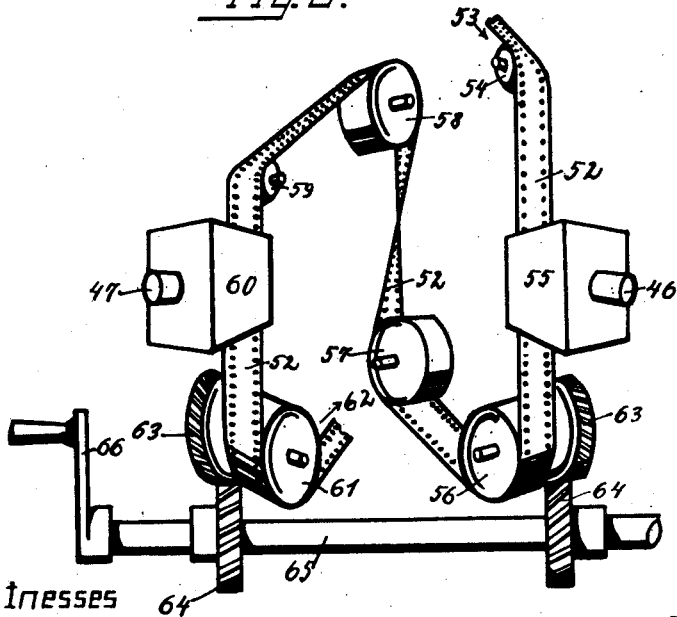

Fig. 1 is the diagram of an arrangement for taking with two apparatuses while avoiding parallax, Fig. 2 is the diagram of a further arrangement for the simultaneous taking of two scenery parts by means of two apparatuses, Fig. 3 the diagram of a still further arrangement at which the taking apparatuses are united into one apparatus, Fig. 4 is a section through the mirror and the masks used for the embodiment Fig. 2, Fig. 5 is the plan view of a device for moving the masks simultaneously and in the same directions, Figs. 6 and 7 are views of the masks arranged in front of and behind the mirror, Fig. 8 is a diagrammatical perspective view of the film guiding means in an apparatus, Fig. 9 is a section to a self-contained taking apparatus according to Fig. 2 in which a film can be exposed from two sides.

According to Fig. 1 separate but exactly identical or interfitting takings are made from one object 70 by means of the two apparatuses 71 and 72. To this end I arrange in the intersecting point of the two center lines 73 and 74 of the angularly adjusted apparatuses 71 and 72 a semi-transparent mirror 75 behind which a black non-actinic mask 76 is positioned opposite the apparatus 71. The apparatus 71 is thus taking the mirage and apparatus 72 taking the throughsight through the mirror 75. It is not necessary that the mirror be arranged in the section point of the straight center lines coming from the apparatuses, the center lines can also once more be deflected by special mirrors as this will be explained later on.

According to Fig. 2 two apparatus 3 and 4 are used for the taking of the scenes 1 and 2. Each of these apparatuses is separately working for itself and is in certain instances with advantage synchronously actuated with the other apparatus by means of a flexible shaft or the like through the handle 5 of the one apparatus 3. The apparatuses are carried on standards 6 or other suitably constructed bases as this is known in the art. The center lines of the apparatuses 3 and 4 are crossing each other and a semi-permeable mirror 7 is arranged at the crossing or intersecting point. The apparatuses 3 and 4 must in any event be so positioned to the mirror 7 that they can themselves not reflect in the mirror. It is then not necessary to adjust the apparatuses in one definite angular relationship, only the above mentioned condition must be complied with. By having the mirror 7 arranged in the section point of the two center lines of the apparatuses 3 and 4 each apparatus gets the same picture window at the mirror plane. The mirror surface is thus at the intersection of the connecting lines of the lens centers of the two objectives 8 and 9 of the apparatuses 3 and 4 which must at this embodiment have the same focus in order to produce the same picture. The picture portion of one scene which is photographed by reflection through the apparatus 3 is directly photographed by the other apparatus through the sight window of the semi-transparent mirror 7 or inversely, as this will be readily understood.

On account of the angular adjustment of the apparatuses 3 and 4 the picture of the one apparatus will appear to that of the other apparatus in side inversion, wherefore the film tape must in the one apparatus have its sensitized layer turned away from the objective or the picture must be reversed by other known means, for example a prism.

The reflecting parts of the through-sight mirror surface of mirror 7 must be covered by a rearwardly disposed black lining. This is effected by masks 10 and 11 which must be so positioned that they are respectively out of the sight cone of the other apparatus. These masks are preferably arranged on glass plates 12 (Figs. 6 and 7) and the inner silhouette 13 of the mask 10 coincides as to its shape with the outer silhouette 14 of mask 11. The masks and silhouettes must in the same degree as their distance from the mirror increases be larger as the picture section on the mirror 7 is appearing. If the masks 10 and 11 are positioned at different distances from the mirror 7 their sizes and silhouette changes in the same proportion as the distantly disposed mask for the mirror increases or decreases.

According to Fig. 2 the mirror 7 is arranged on a standard 15 and the masks 10 and 11 are arranged on standards 16 and 17. Since however the floor of the taking studio is never so solid as to give a guarantee against vibrations of the floor it is preferable to unite the masks 10 and 11 with the mirror 7 and to arrange them on a single common standard. This standard is preferably provided with special carrying devices for the apparatuses 3 and 4 so that the apparatuses, the mirror 7 and the masks 10 and 11 are forming an integral unit which eliminates any mutual shifting or displacement of the individual part.

Fig. 4 is illustrating an arrangement where the mirror 7 is combined with the masks 10 and 11. Between the two plates 18 and 19 which can be connected with each other in any suitable way the mirror 7 is carried by grooves 20. The plates 18 and 19 are further provided with grooves 21 receiving the glass plates 12 carrying the masks 10 and 11. The glass plates 12 are prefer- ably provided with the frame 22 whereby they can be easily displaced. This body comprising the mirror 7, the plates 18 and 19, and the mask plates constitutes a unitary structure. The lower plate 19 is at its center provided with a guiding member 23 engaging with its prism-shaped edges a turning member 24 and can be moved by a spindle 25 and nut 26. The member 24 is carried with a circular lug 27 in a socket 28 and is held therein against lifting by a screw 29 screwed into the base member 28. The base member 28 is guided on a bracket 30 and can be laterally adjusted by a spindle 31 having a handle 32 and being in threaded engagement with a nut 33. The bracket 30 can be vertically adjusted by engaging with vertical parallel guides 34 corresponding to nonillustrated guides of a stationary standard.

The member 24 is provided with a worm gearing 35 meshing with the worm 36 having its bearing 37 on the base member 28 and rotatable by means of a nonillustrated handle. By means of this arrangement the mirror 7 and the masks 10 and 11 can exactly be adjusted around a vertical axis.

The above described adjusting device carrying the mirror 7 and the masks 10 and 11 can in the same construction also be used for anyone of the apparatuses 3 and 4 which in this instance can be guided also on the same standard as the bracket 30. All of the parts 3, 4, 7, 10, and 11 may then be carried by the same standard or frame whereby relative movements of the individual parts due to vibrations are successfully prevented. This is of particular importance if the parts are arranged in close proximity.

In order that different parts of the scenes 1 and 2 can be taken it is frequently necessary that these parts can easily be changed during the taking, which can the most easily be obtained by a displacement or shift of the masks 10 and 11, provided that the shifting of a mask 10 results in the simultaneous shifting of the mask 11 in the same direction. An arrangement permitting to make use of this idea is illustrated in Figs. 4 and 5. At this embodiment the frame 22 of each mask is provided with a stud 39 upwardly extending through slots 38 of the plate 18. This stud 39 engages with a rope 41 guided in crossed path by rollers 40 and thus producing at the shifting of one mask an exactly alike shifting of the other mask.

A modification of the silhouettes 13 and 14 on the plate 12 can be obtained in a rather simple way by superimposing on a glass plate 12 two identical or complementary masks 10 and 11 and effecting a modification of the silhouettes 13 and 14 by a relative displacement of the masks of one plate. Obviously the modification of a silhouette 13 requires the same modification of the silhouette 14 which can be obtained in exactly the same way as the simultaneous shifting of the masks 10 and 11.

The presently described arrangement is based on the use of a uniformly coated semi-transparent mirror. One can however also use a mirror reflecting to both sides and carrying the mirror foil as silhouettes by inactinic complementary blindings or coverings corresponding to the masks 10 and 11. In this instance the mirror must be movable in exactly the same way as the masks 10 and 11, which can be obtained by a special arrangement corresponding to that of Fig. 5.

If only the two scenes 1 and 2 are, following their sizes, to be taken with objectives of different focus on two film tapes complementing themselves to a picture, the semi-transparent mirror 7 is only used for the exact adjustment of the individual parts and for the pictural adaptation or interfitment or the impermeable mirror reflecting to both sides and provided with blindings is used instead thereof and removed after adjustment and before the taking operation. The apparatuses 3 and 4 are if necessary positioned at different distances from the mirror according to their focus. In this instance the mirror must not be necessarily semi-transparent, one can also use an ordinary mirror reflecting to both sides without departing from the nature of this invention.

If combination takings are in consideration a positive film must be produced by a copying process from the two separately taken films. In order to avoid the joint copying the taking film can be passed directly from one apparatus 3 to the other apparatus 4 during the taking operation. The action will then be timely separated in both apparatuses by some pictures which however is irrelevant for the total picture. In order to limit the timely separation of the takings to a possibly small degree one can also unite two apparatuses into one common apparatus as this is shown in Figs. 3, 8 and 9.

According to Fig. 3 I arrange between the two scenes 42 and 43 the mirror 45 carried by standards 44 and completely corresponding to the mirror 7 of Fig. 2. The taking apparatus has two objections 46 and 47 of which objective 46 is directly taking the scene 42 by reflection whereas the objective 47 is indirectly taking the scene 43 by the intermediary of the mirrors 50 and 51 carried by standards 48 and 49. The arrangement of the mirrors can also be the same as illustrated in and described with regard to Figs. 2, 4 and 5.

The film tape 52 (Fig. 8) must be so guided that the objective 46 exposes the film from the front side and the objective 47 from the back side. The film tape arrives from a nonillustrated drum in the direction of the arrow 53 and passes over a roller 54 to the picture window of the camera 55 of the objective 46. From here the film tape is running over a feeding roller 56 to a guiding roller 57 and then with a deflection of 90° to the roller 58 arranged at 90° to the roller 57. From this roller 58 the tape 52 is passing over a roller 59 to the camera 60 of objective 47 and from here over a feeding roller 61 in the direction of arrow 62 to the nonillustrated on winding drum. The two feeding rollers 56 and 61 are actuated by the intermediary of worm gears 63 and 64 from a common shaft 65 having a handle 66 or other suitable operating device.

In Fig. 9 the gears 63 and 64 of the two rollers 56 and 61 are illustrated in different size. The numbers of revolutions in the time unit are however alike, because for any roller the corresponding pair of gears 63 and 64 is of the same size. It was only necessary to give to the gears 63 and 64 for both rollers 56 and 61 different sizes because the two rollers 56 and 61 are somewhat superimposed. Preferably the two cameras 55 and 60 are combined in a box 67 receiving all of the roller guiding means and film spools.

What I claim as my invention is:—

1. An apparatus for taking composite motion pictures of complementary sets or scenes comprising a pair of cameras having the axes thereof located at an angle to each other with the axes' intersecting, and a reflecting surface arranged at the intersection and disposed between one of the sets or scenes and a camera so that an image of one of the scenes may be reflected into one camera while the other scene may be photographed directly by the other camera, and a complementary mask eliminating portion of a set or scene and disposed between a set or scene and the reflecting surface.

2. An apparatus for taking composition motion pictures of complementary sets or scenes comprising a pair of cameras having the axes thereof located at an angle to each other with the axes intersecting, and a semi-transparent mirror arranged at the intersection and located between a set or scene and a camera so that an image of one of the scenes may be reflected into one camera while the other scene may be photographed directly by the other camera, a mask for eliminating a portion of one set or scene and a second mask for eliminating a portion of the other set or scene, each mask being disposed between the semi-transparent mirror and a camera.

3. An apparatus for taking composite motion pictures of complementary sets or scenes comprising a pair of cameras having the axes thereof located at an angle to each other with the axes intersecting, and a semi-transparent mirror arranged at the intersection and located between a camera and a set or scene so that an image of one of the sets or scenes may be reflected into one camera while the other scene may be photographed directly by the other camera, and a mask located between each scene and the mirror, one mask being complementary to the other mask, and means for moving the masks relative to each other.

4. An apparatus for taking composite motion pictures of complementary sets or scenes comprising a pair of cameras having the axes thereof located at an angle to each other with the axes intersecting, and a semi-transparent mirror arranged at the intersection and located between a camera and a set or scene so that an image of one of the sets or scenes may be reflected into one camera while the other scene may be photographed directly by the other camera, and a mask located between each scene and the mirror, one mask being complementary to the other mask, and means for moving the masks relative to the mirrors.

5. An apparatus for taking composite motion pictures of complementary sets or scenes comprising a pair of cameras having the axes thereof located at an angle to each other with the axes intersecting, and a semi-transparent mirror arranged at the intersection and located between a camera and a set or scene so that an image of one of the scenes may be reflected into one camera while the other scene may be photographed directly by the other camera, a mask located between each scene and the mirror, one mask being complementary to the other mask, and means for supporting the mirrors and masks.

6. An apparatus for taking composite motion pictures of complementary sets or scenes comprising a pair of cameras having the axes thereof located at an angle to each other with the axes intersecting, and a reflecting surface arranged at the intersection and located between a camera and a set or scene so that an image of one of the scenes may be reflected into one camera while the other scene may be photographed directly by the other camera, a mask located between each scene and the mirror, one mask being complementary to the other mask, means for moving the mirrors and masks relative to the cameras, and means for moving the masks relative to each other.

7. An apparatus for taking composite motion pictures of complementary sets or scenes comprising a pair of cameras having the axes thereof located at an angle to each other with the axes intersecting, and a reflecting surface arranged at the intersection and located between a camera and a set or scene so that an image of one of the scenes may be reflected into one camera while the other scene may be photographed directly by the other camera, a mask located between each scene and the mirror, one mask being complementary to the other mask, and means for moving the masks in synchronism relative to the mirror.

8. An apparatus for taking composite motion pictures of complementary sets or scenes comprising a pair of cameras having the axes thereof located at an angle to each other with the axes intersecting, and a reflecting surface arranged at the intersection and located between a camera and a set or scene so that an image of one of the scenes may be reflected into one camera while the other scene may be photographed directly by the other camera, a mask located between each scene and the mirror, one mask being complementary to the other mask, a frame for supporting the mirror and masks as a unit, means for moving the frame horizontally, and means for moving the masks in synchronism in the frame and relative to the mirror.

9. An apparatus for taking composite motion pictures of complementary sets or scenes comprising a pair of cameras having the axes thereof located at an angle to each other with the axes intersecting, and a reflecting surface arranged at the intersection and located between a camera and a set or scene so that an image of one of the scenes may be reflected into one camera while the other scene may be photographed directly by the other camera, a mask located between each scene and the mirror, one mask being complementary to the other mask, a frame for supporting the mirror and masks as a unit, means for moving the frame horizontally, and means for rotating the frame, and means for adjusting the frame vertically.

10. The method of producing composite motion pictures in separate stages of a set or scene and a second set complementary to the first set which comprises arranging a pair of cameras so that their optical axes will be at an angle to each other and a combined light transmitting and reflecting member at the intersection of the optical axes of the cameras, the reflecting member being located between a set or scene and a camera, forming an image of a portion of one set or scene on a portion of a frame in one camera directly through the light transmitting portion and indirectly forming an image on the second set or scene in the second camera on the unexposed portion of the same frame by the reflected image of the second set or scene, while masking complementary portions of the sets or scenes and blending the meeting edges of the images formed on the frame into each other.

In testimony whereof I have affixed my signature.

EUGEN SCHÜFFTAN.